2,795,529

STABILIZED HYALURONIDASE SOLUTION CONTAINING CALCIUM CHLORIDE

Harvey E. Alburn, Paoli, and Robert W. Whitley, North Wales, Pa., assignors to American Home Products Corporation, New York, N. Y., a corporation of Delaware No Drawing. Application June 17, 1954,
Serial No. 437,594

3 Claims. (Cl. 167—73)

This application is a continuation-in-part of patent application Serial No. 327,175, now abandoned, filed by Harvey E. Alburn and Robert W. Whitley on December 20, 1952 for Stabilized Aqueous Hyaluronidase Solutions.

This invention relates to stabilized aqueous hyaluronidase solutions in which the stabilizing constituent is ethylenediaminetetraacetic acid.

Hyaluronidase is a proteinaceous enzyme having the property of hydrolyzing hyaluronic acid. Hyaluronic acid is a mucopolysaccharide of high molecular weight forming an essential component of ground substance or cement substance of the tissues. Its aqueous solutions have a high viscosity.

Because the high viscosity of aqueous solutions of hyaluronic acid is reduced by the hydrolytic action of hyaluronidase, hyaluronidase has found successful clinical application in promoting the absorption by tissues of therapeutic liquids. The reduced viscosity due to this hydrolysis appears to permit more rapid diffusion of the therapeutic fluid introduced. In one application, for example, by the use of hyaluronidase hypodermaclysis can be substituted in many cases for intravenous injection with attendant advantages to patient and physician. Hyaluronidase can also be used with advantage in local anesthesia. Other uses are known.

Prior to this invention hyaluronidase had been sold in solid form—as a powder in sealed ampules containing lactose as an inert excipient to facilitate handling. Although it would have been more advantageous for medical use to have it available in solution, this was impractical because of the instability of hyaluronidase in aqueous solution in which it becomes denatured at room temperature.

It is an object of this invention to provide an aqueous solution of hyaluronidase suitable for parenteral use and having sufficient stability to enable it to be sold, stored and dispensed as such, e. g. at temperatures from 15° to 30° C.

According to our invention we provide a dilute solution comprising hyaluronidase and ethylenediaminetetraacetic acid ($HO_2C \cdot CH_2)_2N \cdot CH_2 \cdot CH_2 \cdot N(CH_2 \cdot CO_2H)_2$; the solution also preferably contains a soluble physiologically acceptable salt such as sodium chloride and calcium, added, for example, as calcium chloride. The reaction should be nearly neutral. For this purpose we incorporate a small amount of buffer in the solution.

Ethylenediaminetetraacetic acid, which we abbreviate to EDTA has previously been used to stabilize various chemicals, including pharmaceuticals, because of its metal-ion-"sequestering" power, i. e., its ability to form complexes with heavy metals in which the metal is no longer ionized. Thus it can protect certain products which are sensitive to heavy metal ions.

In the present case the instability of aqueous solutions of hyaluronidase is a more complex affair and is profoundly affected by other conditions than the presence of heavy metal ions, which are not the controlling factor in stability.

The only prior attempt to use EDTA with hyaluronidase which we have been able to find is reported in a paper by Meyer and Rapport in J. Biol. Chem., 188 (1951), 485–490. These workers studied the instantaneous deactivation of hyaluronidase by heavy metal ions and its reactivation as well as the prevention of deactivation by several organic and inorganic agents. They envisaged the action as a competition for the heavy metal ion between hyaluronidase and the protective agent. According to these authors, to the extent the protective agent prevails in this competition the hyaluronidase is protected against deterioration due to heavy metals. Among the protective agents tested was "Versene," a commercial form of EDTA. The authors conclude that chelating agents such as oxine and Versene are rather poor competitors of the enzyme for the metal. It is to be noted that these authors investigated only the instantaneous and reversible deactivation of the enzyme and not its long-time stability.

Our investigations have shown that other factors than heavy metals are chiefly responsible for hyaluronidase deactivation and that heavy metals play an insignificant role in its deactivation under practical conditions. For example, the copper-purified enzyme is more stable in aqueous solutions than the alcohol-purified enzyme although the former has a higher content of copper and iron impurities. Alcohol-purified hyaluronidase, however, is preferred from the clinical viewpoint because of its greater purity and from the manufacturing viewpoint because of the greater efficiency of the alcohol-purification process. Surface forces play an important role in deactivating hyaluronidase in aqueous solution. It appears that there is a tendency in the dilute proteinaceous enzyme solution for the protein molecules to concentrate at the air-water interface. Under these conditions the unbalanced surface forces appear to act on some of the weak bonds between the amino acid chains and cause the protein molecules to partially disassociate and lose their enzyme activity. While we do not wish to commit ourselves irrevocably to this theory of inactivation, we have proved by comparative experiments that increasing the air-water interface of dilute aqueous solutions of hyaluronidase greatly increases the rate of deactivation. That this deactivation is not due to oxidation was proved by saturating such solutions with oxygen and finding no increase in deactivation.

EDTA substantially reduces deactivation of hyaluronidase due to surface action.

The addition of certain salts to aqueous hyaluronidase solutions, notably sodium and calcium chloride, improves the stability of such solutions, and if EDTA is also present, increases the stabilizing power of the latter. The presence of calcium chloride has also been found to lessen the pain of injection.

From the above discussion it will be seen that the deactivation of hyaluronidase is a complex reaction in which the presence of heavy metal ions plays an insignificant role. Quite possibly factors as yet undiscovered come into play. It is a remarkable fact, which could not be foreseen from prior knowledge, that EDTA exerts a strong inhibitory effect on all known deactivation reactions of hyaluronidase and its use makes possible the production of a stable solution of hyaluronidase suitable for parenteral injection.

This experimentally determined fact raises the difficult question of the mechanism of the protective action. We have as yet been unable to determine what this is but suggest (without limiting ourselves to this explanation) that the protective action is due in part at least to the formation of a complex including hyaluronidase and EDTA, the complex being more stable than hyaluronidase alone and not interfering with the enzyme action of the latter.

According to our invention we dissolve a small amount of hyaluronidase, e. g. 25–1000 TRU/ml., in water, preferably pyrogen-free and containing a small amount of sodium or calcium chloride or both, e. g. 0.12–0.15 M NaCl or 0.00027–0.0027 M CaCl$_2$ or both, together with 0.1–1.0 mg./ml. EDTA disodium salt dihydrate, and adjust the solution to a reaction ranging from slightly acid to approximately neutral, e. g. pH 4.5–8.0. The ratio of CaCl$_2$ to EDTA is preferably equimolar with a plus or minus variation of 5%. Since a chelate is apparently formed by calcium chloride and EDTA, this chelate may be prepared in advance as by making a solution of equimolecular amounts of calcium chloride and EDTA and incorporating a suitable amount of this solution in the hyaluronidase solution. The reaction of the hyaluronidase solution may be controlled by adding a suitable buffer such as 0.01 ionic strength phosphate or acetate buffer. A small amount of a preservative agent, such as "Merthiolate" (sodium ethylmercurithiosalicylate) 1:10,000, may also advantageously be present. If phosphate buffer is used, the calcium chloride should be added after the addition of EDTA in order to avoid the precipitation of calcium phosphate. These amounts are intended to be illustrative only and not absolute limitations, as it will be recognized by those skilled in the art that variations may be introduced without departing from the spirit of our invention.

In the average solid hyaluronidase preparation 150 TRU are contained in 0.2 mg. Twenty-five TRU therefore are contained in 0.033 mg. and 1000 TRU in 1.33 mg. For general therapeutic use a solution of 150–200 TRU/ml. is convenient. Where, however, only a small area or volume is to be infiltrated, as for example in dental anesthesia, a dilute solution containing as little as 25–30 TRU/ml. may be advantageous. On the other hand, in some uses, as for example in treating kidney stones, a more concentrated solution is desirable, containing, say, 600 TRU/ml. or more.

We have found further that the addition of a small amount of a simple amino acid, such as glycine and arginine, will in some cases reinforce the protective action of EDTA, but such addition is optional and not essential to our preferred compositions.

In the present disclosure the terms ethylenediaminetetraacetic acid and EDTA are intended to include the simple non-toxic water-soluble salts. EDTA is commercially available in several forms; the dihydrate of the disodium salt having a molecular weight of 372.25 has been found most convenient to use for the purposes of the present invention, but the invention is not limited to the use of this precise salt. The EDTA salt present in the solution is determined in part by the salt added qua se and in part by the buffer used to adjust pH or by other added salts. In the examples below, the disodium dihydrate salt of EDTA was used and concentrations are expressed in terms of this salt. The EDTA anion is the important functioning unit. The term TRU indicates "turbidity-reducing units" as used in the turbidimetric assay described by Alburn and Whitley in J. Biol. Chem., 192 (1951), 379–393. Copper-purified hyaluronidase was prepared from fresh-frozen bovine testes by a method based on Hahn, Biochem. Ztsch., 315 (1943), 83–96, and alcohol-purified hyaluronidase was prepared by the method of Tint and Bogash, J. Biol. Chem., 184 (1950), 501.

In the following examples data are furnished on embodiments of our invention and on comparative experiments discussed above in more general terms. These examples are intended to be illustrative only and not to limit our invention, the scope of which is defined in the appended claims.

Assays yielding the results tabulated below were made by the method of Alburn and Whitley (loc. cit. supra).

EXAMPLE 1

*Stability of alcohol-purified hyaluronidase in various media at 37° C.*

The solutions were made up in 1:10,000 aqueous Merthiolate and contained 192 TRU/ml. Five ml. volumes were placed in 5 ml. vials at 37° C.

| Solution | Percent Activity Lost | |
|---|---|---|
| | 30 days | 60 days |
| Water | 100 | 100 |
| 0.01 M phosphate buffer, pH 7.0 | 100 | 100 |
| 0.15 M NaCl | 9 | 38 |
| 0.15 M CaCl$_2$ | 23 | 39 |
| 1 mg./ml. EDTA·Na$_2$·2H$_2$O | 75 | 94 |
| 1 mg./ml. EDTA·Na$_2$·H$_2$O+0.15 M NaCl | 4 | 10 |

EXAMPLE 2

*Effect of ratio of air-water interface to volume of solution—without agitation*

The solutions of alcohol-purified hyaluronidase were made up in 1:10,000 aqueous Merthiolate and contained 192 TRU/ml. Three ml. or 10 ml. were placed in 10 ml. vials as indicated and stored at 37° C. without shaking.

| Solution | Percent Activity Lost, 30 Days | |
|---|---|---|
| | 3 ml. in vial | Full vial |
| 0.15 M NaCl | 35 | 14 |
| 1 mg./ml. EDTA·Na$_2$·2H$_2$O+0.15 M NaCl | 6 | 6 |

EXAMPLE 3

*Effect of air-water interface with agitation*

Five-tenths ml. of solutions made up as in Example 2 and containing 170 TRU/ml. were placed in 10 ml. vials attached horizontally around the periphery of a ball-mill container rotated at 120 R. P. M. at 37° C.

| Solution | Percent Activity Lost, 20 Hours |
|---|---|
| 0.15 M NaCl | 70 |
| 1 mg./ml. EDTA·Na$_2$·2H$_2$O+0.15 M NaCl | 19 |

EXAMPLE 4

*Comparison of copper-purified and alcohol-purified hyaluronidase*

Solutions of copper-purified hyaluronidase containing 145 TRU/ml., 0.15 M NaCl and 0.01 M phosphate buffer in 1:10,000 aqueous Merthiolate at pH 7.0, with and without EDTA·Na$_2$, were stored at 37° C. for the indicated times.

| Solution | Percent Activity Lost | |
|---|---|---|
| | 41 days | 90 days |
| Without EDTA | 19 | 33 |
| 1 mg./ml. EDTA·Na$_2$·2H$_2$O | 8 | 17 |

Solutions of alcohol-purified hyaluronidase, as above, but containing 192 TRU/ml.

| Solution | Percent Activity Lost | | |
|---|---|---|---|
| | 15 days | 32 days | 60 days |
| Without EDTA | 27 | 35 | 37 |
| 1 mg./ml. EDTA·Na$_2$·2H$_2$O | 3 | 4 | 10 |

| | Metal Impurities in Hyaluronidase in Above Described Tests | |
|---|---|---|
| | Cu, percent | Fe, percent |
| Cu-purified | 0.2 | 0.03 |
| Alcohol-purified | 0.002 | 0.01 |

EXAMPLE 5

*Long-term stability of hyaluronidase at 37° C.*

Solutions of copper-purified hyaluronidase having an activity of 1350 TRU/mg., containing an enzyme concentration of 145 TRU/ml., 0.15 M NaCl and 0.01 ionic strength phosphate buffer, in 1:10,000 aqueous Merthiolate were stored at 37° C. for the indicated times.

| Solution | Percent Activity Lost | | | | |
|---|---|---|---|---|---|
| | 41 days | 90 days | 136 days | 6 months | 9 months |
| Without EDTA | 19 | 33 | 50 | 55 | 61 |
| 1 mg./ml. EDTA·Na₂·2H₂O | 8 | 17 | 32 | 28 | 34 |

EXAMPLE 6

*Long-term stability of hyaluronidase solutions containing calcium chloride*

The relative stabilities at different temperatures under otherwise comparable conditions of hyaluronidase with and without EDTA and with varying amounts of calcium chloride are shown in the following table, for a 6-month period. The solutions were made up by dissolving the ingredients used in the required amounts in 800 ml. pyrogen-free water in the following order, each ingredient being completely dissolved before the next was added: NaCl; EDTA·Na₂ dihydrate; CaCl₂ (from a standardized stock solution); NaH₂PO₄·H₂O; Na₃PO₄·12H₂O; Merthiolate (Lilly). Powdered hyaluronidase was then dissolved to provide about 200 TRU/ml., the solution filtered and diluted to 1 liter. Five ml. volumes were sealed in low-soluble 7 ml. glass vials for the test, the ratio of air-liquid surface in cm.² to volume in cm.³ being about 0.5:1. Each vial contained the ingredients in the concentrations shown in the table, in addition to approximately 8.45 g. NaCl and 0.1 g. Merthiolate per liter and sufficient of the phosphate salts to provide a pH of about 7.0.

| Initial Assy, TRU/ml. | EDTA·Na₂·2H₂O, g./l. | CaCl₂, g./l. | Temp., °C. | Activity Loss in 6 months, Percent |
|---|---|---|---|---|
| 206 | 1.0 | | 5 | 6 |
| | | | 25 | 12 |
| | | | 37 | 35 |
| 205 | 1.0 | 0.268 | 5 | 1 |
| | | | 25 | 10 |
| | | | 37 | 34 |
| 205 | 1.0 | 0.283 | 5 | 4 |
| | | | 25 | 11 |
| | | | 37 | 34 |
| 207 | 1.0 | 0.298 | 5 | 6 |
| | | | 25 | 15 |
| | | | 37 | 35 |
| 205 | 1.0 | 0.313 | 5 | 7 |
| | | | 25 | 16 |
| | | | 37 | 35 |
| | | | | After 2 months |
| 179 | | | 5 | 68 |
| | | | 25 | 86 |
| | | | 37 | 97 |

Discussion of Examples 1–6

Certain conclusions may be drawn from the data assembled above in Examples 1–6:

1. A dilute solution of hyaluronidase in water is extremely unstable, losing all its activity in 15 days at 37° C. Buffering to pH 7 with phosphate buffer does not stabilize it. (Example 1.)
2. Small amounts of NaCl or CaCl₂ improve its stability. (Example 1.)
3. Increasing the air-water interface accelerates its inactivation. (Examples 2 and 3.)
4. The presence of heavy metal ions (Cu and Fe) is not a controlling factor. (Example 4.)
5. The addition of EDTA is effective to inhibit the deactivation rate in the presence of a small amount of sodium or calcium chloride for an extended period of time at an accelerated deactivation temperature (37° C.) under all the conditions investigated. (Examples 1, 2, 3, 4 and 5.)
6. As noted above, the addition of a small amount of a calcium salt was found to eliminate pain on injection of the stabilized hyaluronidase solution. This result is thought due to the formation of a chelate of calcium ion with the EDTA·Na₂. Apparently the free EDTA·Na₂ was responsible for the pain, but the chelate is not painful.

Example 6 shows that the presence of approximately one-quarter to three-tenths gram of calcium chloride per liter has no deleterious effect on the stabilizing action of one gram EDTA per liter, although the latter amount of calcium chloride is sufficient to convert practically all of the EDTA to the chelate form.

These results are surprising. It had hitherto been considered that ethylenediaminetetraacetic acid acted only by deionizing heavy metal impurities, and its use as a protective agent had been limited to such cases. In fact, however, in the only published report on its use with hyaluronidase (Meyer and Rapport, discussed above), it was found not to be an efficient competitor with the enzyme for Cu and Fe ions.

It is to be noted that the tests of Examples 1–6 were accelerated tests, carried out at 37° C. The average range of storage temperatures may be taken as 15°–30° C., the most frequently met being 20°–25° C. Since the rate of loss of activity approximately doubles for a 4° rise in temperature it is quite possible by our invention to provide clinically useful dilute aqueous solutions of hyaluronidase retaining adequate activity for several months.

An example of one embodiment of our invention adapted for clinical use follows.

EXAMPLE 7

A stock solution of analytical grade calcium chloride is prepared in pyrogen-free water which will contain about 30 grams of calcium chloride per liter. The solution is analyzed accurately for calcium concentration by a standard gravimetric procedure.

For each liter of solution to be prepared, to about 800 ml. of pyrogen-free water the following ingredients are added in the order listed. Each ingredient is completely dissolved before the next one is added.

8.45 grams of sodium chloride
1.000 grams of ethylenediamine tetraacetic acid disodium dihydrate ("Versene" or "Sequestrene" 3 times crystallized)
0.298 gram of calcium chloride, added as the stock solution
0.557 gram of monosodium phosphate monohydrate ($NaH_2PO_4 \cdot H_2O$)
1.919 gram of trisodium phosphate dodecahydrate ($Na_3PO_4 \cdot 12H_2O$)
0.100 gram of "Merthiolate"

The hyaluronidase is dissolved cold in this solution, filtered through a bacterial filter and sealed aseptically in sterile vials of the desired size. The vials are of low-soluble glass and are of such size as to keep the air-liquid interface at a minimum. They may be, for example, of 1 ml. capacity for single doses containing 150 TRU, or may be multiple dose vials of 5 ml. or more capacity. Multiple dose 5 ml. vials may contain 600–3000 TRU.

EXAMPLE 8

When hyaluronidase is used with organic-base local anesthetics in the form of their salts, such as their hydrochlorides, it is desirable that the solution have a slightly acid reaction, e. g. in the range 4.5–5.5. The following tables give the results of an accelerated aging test of two such solutions, one without and one with EDTA.

The composition of the solutions was the following:

|  | Solution I | Solution II |
|---|---|---|
| NaCl | 0.15 M | 0.15 M |
| $CaCl_2$ |  | 0.298 mg./ml. |
| Hyaluronidase | 191 TRU/ml. | 232 TRU/ml. |
| $EDTA \cdot Na_2 \cdot 2H_2O$ |  | 1 mg./ml. |
| Merthiolate |  | 1:10000 |
| Sodium acetate buffer to | pH 5.0 | pH 5.0 |

The solutions were stored at 37° C. and lost activity as follows:

|  | Percent activity lost | | | | |
|---|---|---|---|---|---|
|  | 1 month | 2 months | 3 months | 4 months | 5 months |
| Solution I | 32 | 48 | 57 | 61 | 71 |
| Solution II | 12 | 17 | 22 | 31 | 32 |

A solution such as II may be prepared with an added anesthetic salt, e. g. procaine hydrochloride, and stored and dispensed in that form.

We claim:

1. A stabilized solution for parenteral use comprising hyaluronidase in an amount to furnish 25–1000 TRU per milliliter, an amount of ethylenediaminetetraacetic acid approximately equivalent to 0.1–1.0 m. disodium ethylenediaminetetraacetate dihydrate per milliliter, approximately 0.1–0.2 M NaCl, approximately 0.25–0.3 g. $CaCl_2$ for each gram of disodium ethylenediaminetetraacetate dihydrate equivalent, and a non-toxic buffer to provide a reaction in the approximate range pH 4.5–8.0.

2. A sterile sealed vial of glass of low water solubility containing a solution as defined in claim 1, the volume of solution with respect to the capacity of the vial being such as to provide a ratio of air-liquid interface to liquid volume not greater than 0.5 expressed as $cm.^2$ and $cm.^3$ when the vial is in an upright position.

3. A stabilized sterile hyaluronidase solution in pyrogen-free water for parenteral use having an activity in the range 25–1000 TRU per milliliter and containing in addition to the hyaluronidase approximately 1 mg./ml. disodium ethylenediaminetetraacetate dihydrate, 0.15 M NaCl, 0.3 mg./ml. $CaCl_2$, and phosphate buffer to provide a reaction of the order of pH 7.3.

References Cited in the file of this patent

UNITED STATES PATENTS 1,243,349 Smith _____ Oct. 16, 1917

FOREIGN PATENTS 651,545 Great Britain _____ Apr. 4, 1951

OTHER REFERENCES

Schwartzman: Journal of Pediatrics, vol. 33, No. 3, September 1948, pages 267 and 273.

Meyer et al.: Journal Biol. Chem., vol. 188 (1951), pp. 485–490.

Lesser: Drug and Cosmetic Ind., vol. 70, February 1952, p. 264.

Butt et al.: Science, vol. 115, Mar. 21, 1952, page 310.